(12) United States Patent
May

(10) Patent No.: US 9,052,042 B2
(45) Date of Patent: Jun. 9, 2015

(54) HOSE SHROUD

(76) Inventor: Peter Andrew John May, South Perth (AU)

( * ) Notice: Subject to any disclaimer, the term of this patent is extended or adjusted under 35 U.S.C. 154(b) by 202 days.

(21) Appl. No.: 13/639,894

(22) PCT Filed: Apr. 8, 2011

(86) PCT No.: PCT/AU2011/000405
§ 371 (c)(1),
(2), (4) Date: Oct. 23, 2012

(87) PCT Pub. No.: WO2011/123898
PCT Pub. Date: Oct. 13, 2011

(65) Prior Publication Data
US 2013/0037156 A1 Feb. 14, 2013

(30) Foreign Application Priority Data

Apr. 9, 2010 (AU) .................... 2010901514
May 7, 2010 (AU) .................... 2010901955

(51) Int. Cl.
| | | |
|---|---|---|
| *F16L 57/00* | (2006.01) | |
| *F16L 11/22* | (2006.01) | |
| *F16L 11/10* | (2006.01) | |
| *F16L 57/06* | (2006.01) | |

(52) U.S. Cl.
CPC ................. *F16L 11/22* (2013.01); *F16L 11/10* (2013.01); *F16L 57/06* (2013.01)

(58) Field of Classification Search
CPC ................. F16L 11/00–11/26; F16L 2201/30; F16L 23/167; F16L 23/18; H01B 13/2613
USPC .............. 138/110, 128, 151, 156, 118.1–120; 174/102 D, 102 R
See application file for complete search history.

(56) References Cited

U.S. PATENT DOCUMENTS

| 23,781 | A | * | 4/1859 | Punderford | .................. 138/128 |
|---|---|---|---|---|---|
| 25,239 | A | * | 8/1859 | Boyd | ............................ 138/128 |
| 944,985 | A | * | 12/1909 | Pankurst | ....................... 285/405 |
| 970,772 | A | * | 9/1910 | Wold | ............................ 285/410 |
| 1,435,311 | A | * | 11/1922 | Knight | .......................... 138/110 |
| 2,606,953 | A | * | 8/1952 | Kirby | ......................... 174/126.3 |

(Continued)

FOREIGN PATENT DOCUMENTS

GB    2166833 A    5/1986

OTHER PUBLICATIONS

PCT/AU2011/000405, International Search Report, June 14, 2011, Australian Patent Office.

(Continued)

*Primary Examiner* — Paul R Durand
*Assistant Examiner* — Randall Gruby
(74) *Attorney, Agent, or Firm* — Woodling, Krost and Rust

(57) ABSTRACT

A hose shroud (10) comprising a plurality of expanded sections (12) and clamping sections (22), arranged to engage a bundle of hoses or lines, wherein in use, the hose shroud (10) is arranged such that an outer wall (18) of the hose shroud (10) is placed under an inner wall (20) of the hose shroud (10) defining a reservoir (28) therein, the inner wall (20) and outer wall (18) are held in close contact by a plurality of raised protuberances (16) on the outer wall surface (18), the spaced apart inner (20) and outer wall (18) surfaces of the hose shroud (10) are arranged such as to form a lumen (14) to allow fluid communication of fluids leaked within the reservoir (28) and the exterior of the hose shroud (10).

9 Claims, 5 Drawing Sheets

(56) References Cited

U.S. PATENT DOCUMENTS

| | | | | |
|---|---|---|---|---|
| 3,014,827 | A * | 12/1961 | Clinchy et al. | 138/161 |
| 3,273,213 | A * | 9/1966 | Zurkowski | 24/298 |
| 3,360,894 | A * | 1/1968 | Orr et al. | 52/108 |
| 3,379,218 | A * | 4/1968 | Conde | 138/99 |
| 3,601,863 | A * | 8/1971 | Dorsey | 24/16 PB |
| 3,689,114 | A * | 9/1972 | Meserole | 285/373 |
| 3,770,556 | A * | 11/1973 | Evans et al. | 428/77 |
| 3,924,661 | A * | 12/1975 | Bornhoffer | 138/110 |
| 3,956,437 | A * | 5/1976 | Ellis | 264/40.1 |
| 4,018,983 | A * | 4/1977 | Pedlow | 174/135 |
| 4,218,814 | A * | 8/1980 | Hodapp | 29/450 |
| 4,657,287 | A * | 4/1987 | Nimke | 285/373 |
| 4,704,315 | A * | 11/1987 | McClintock | 428/41.1 |
| 4,709,730 | A | 12/1987 | Zwilling | |
| 4,929,478 | A * | 5/1990 | Conaghan et al. | 428/35.1 |
| 5,027,862 | A * | 7/1991 | Laybourn | 138/99 |
| 5,186,215 | A * | 2/1993 | Gilleland | 138/98 |
| 5,383,693 | A * | 1/1995 | Shade | 285/373 |
| 5,411,777 | A * | 5/1995 | Steele et al. | 428/34.9 |
| 5,413,149 | A * | 5/1995 | Ford et al. | 138/123 |
| 5,535,787 | A * | 7/1996 | Howell | 138/167 |
| 5,560,395 | A * | 10/1996 | Bissonnette et al. | 138/98 |
| 5,613,522 | A * | 3/1997 | Ford et al. | 138/123 |
| 5,715,578 | A * | 2/1998 | Knudson | 24/16 PB |
| 6,111,194 | A * | 8/2000 | Kroulik | 174/47 |
| 6,256,938 | B1 * | 7/2001 | Daton-Lovett | 52/108 |
| 6,298,882 | B1 * | 10/2001 | Hayes et al. | 138/99 |
| 6,308,741 | B1 * | 10/2001 | Payne | 138/110 |
| 6,315,001 | B1 * | 11/2001 | Anderson | 138/106 |
| 6,315,759 | B1 | 11/2001 | Peterson | |
| 6,341,626 | B1 * | 1/2002 | Davenport et al. | 138/110 |
| 6,431,216 | B1 * | 8/2002 | Briscoe | 138/110 |
| 6,649,828 | B2 * | 11/2003 | Rockney et al. | 174/36 |
| 6,659,136 | B2 * | 12/2003 | Fukui et al. | 138/125 |
| 6,842,948 | B2 * | 1/2005 | Smith | 24/16 R |
| 7,216,678 | B2 * | 5/2007 | Baer | 139/384 R |
| 7,241,482 | B2 * | 7/2007 | Ferrand | 428/40.1 |
| 7,325,575 | B1 * | 2/2008 | O'Donnell et al. | 138/110 |
| 7,895,716 | B2 * | 3/2011 | Taillon et al. | 24/16 R |
| 8,205,314 | B1 * | 6/2012 | Dermody, IV | 29/428 |
| 8,757,215 | B2 * | 6/2014 | Burdy | 139/384 R |
| 8,875,744 | B2 * | 11/2014 | Taagepera et al. | 138/110 |
| 8,952,274 | B2 * | 2/2015 | Lalancette | 174/480 |
| 2007/0163305 | A1 * | 7/2007 | Baer et al. | 66/171 |
| 2008/0105324 | A1 * | 5/2008 | Baer | 139/386 |
| 2008/0135119 | A1 * | 6/2008 | Tonooka et al. | 138/110 |
| 2009/0260705 | A1 * | 10/2009 | Ainsworth | 138/110 |

OTHER PUBLICATIONS

PCT/AU2011/000405, Written Opinion, June 14, 2011, Australian Patent Office.

* cited by examiner

HOSE SHROUD

FIELD OF THE PRESENT INVENTION

The present invention relates to a hose shroud.

BACKGROUND OF THE INVENTION

It is known when using a number of hydraulic hoses and lines or the like are often formed into a bundle of hoses which are connected by clamps or mounting brackets. Bundles are formed to keep the workspace clear and the hoses or lines untangled.

The clamps and mounting brackets used to form a bundle of hoses or lines can work to increase wear on the hoses or lines as the clamps and mounting brackets may act as a friction point that rub against the outer casings of the hoses or lines. It is also known that rock fragments or swarf can become engaged with the bundle where they cause premature wear through damage to the outer casings of the hoses or lines.

It is known that hydraulic hoses or lines may also present significant danger to personnel. Failure of the outer casing may occur whereby the contents of the hose or line, which are kept under pressure, are explosively released. In industrial high pressure applications this has been known to cause significant injury and even death.

The present invention provides a hose shroud which attempts to overcome at least in part the aforementioned disadvantages of the prior art.

SUMMARY OF THE PRESENT INVENTION

In accordance with one aspect of the present invention there is provided a hose shroud arranged to cover and engage a bundle of hoses or lines, spaced apart inner and outer wall surfaces of the hose shroud being arranged to foml a lumen to allow the passage of fluids contained within the hose shroud to the exterior of the hose shroud.

BRIEF DESCRIPTION OF DRAWINGS

The present invention will now be described, by way of example, with reference to the accompanying drawings, in which.

DESCRIPTION OF THE INVENTION

Figure 1:
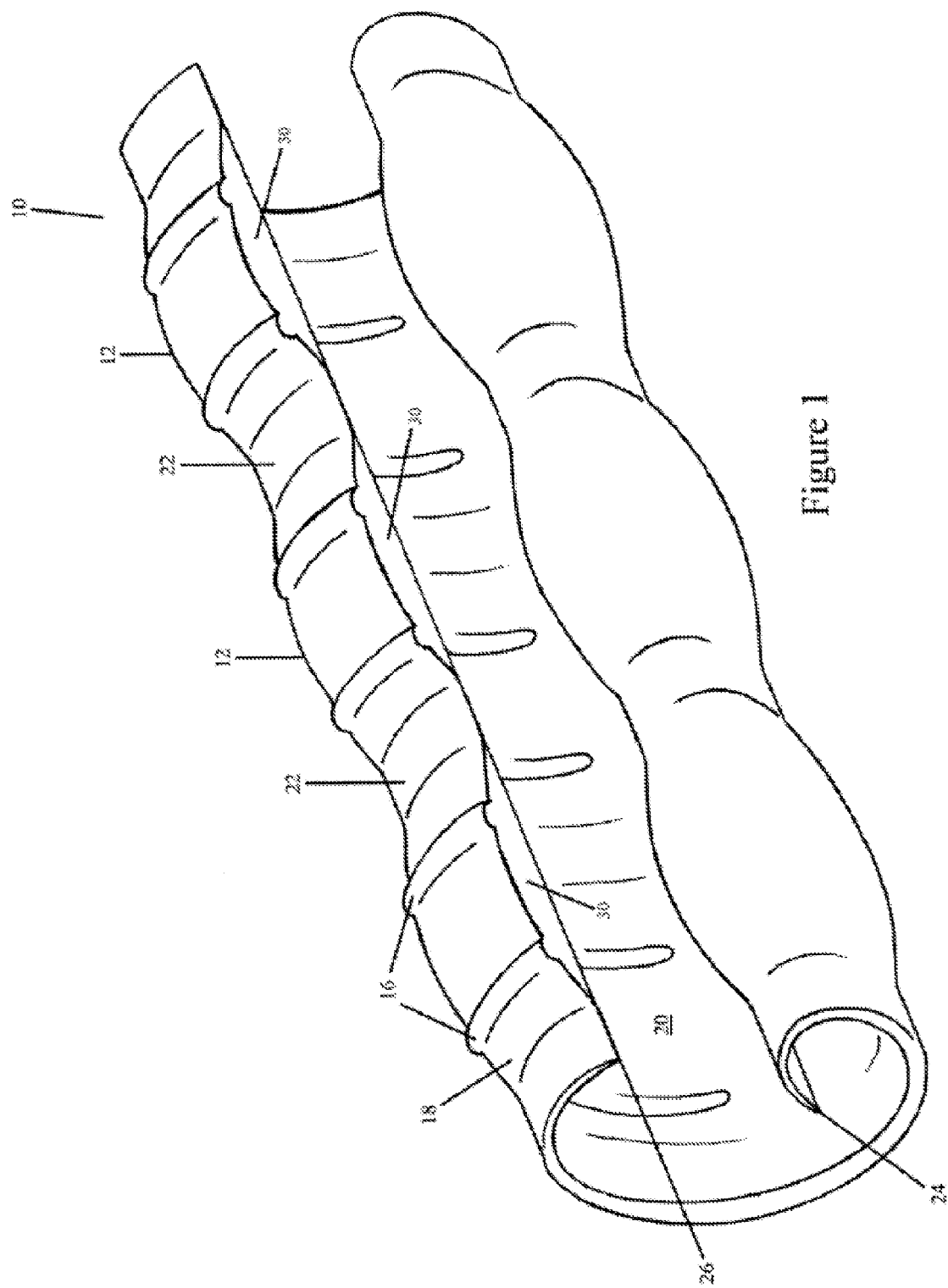
FIG. 1 shows a hose shroud in accordance with the present invention.

Referring to FIG. 1 of the accompanying drawings, there is shown an elongated hose shroud 10 arranged to engage a bundle of hoses or lines. The hose shroud 10 comprises a plurality of expanded sections 12 which are separated by a plurality of relatively narrow clamping sections 22. The hose shroud 10 is preferably formed of a polymer material, more preferably the hose shroud comprises a thermoplastic polymer material, even more preferably a polyurethane material.

The hose shroud 10 may be of any length. However, the hose shroud 10 preferably starts and ends with a clamping section 22.

Each expanded section 12 comprises an outer wall 18 surface and a plurality of raised protuberances 16 formed on the outer wall 18. The raised protuberances 16 extend from the outer wall 18 for at least part of the circumference of the hose shroud. A web portion 30 may additionally be provided at the terminating portions of the outer wall surface 18 in each of the expanded sections 12 to prevent swarf or foreign material entering the lumen 14. The web portions 30 are arranged to prevent swarf or foreign material entering the lumen 14 by forming a physical barrier to entry, however, fluid traveling through the lumen 14 will pass the web portion 30.

Figure 3:
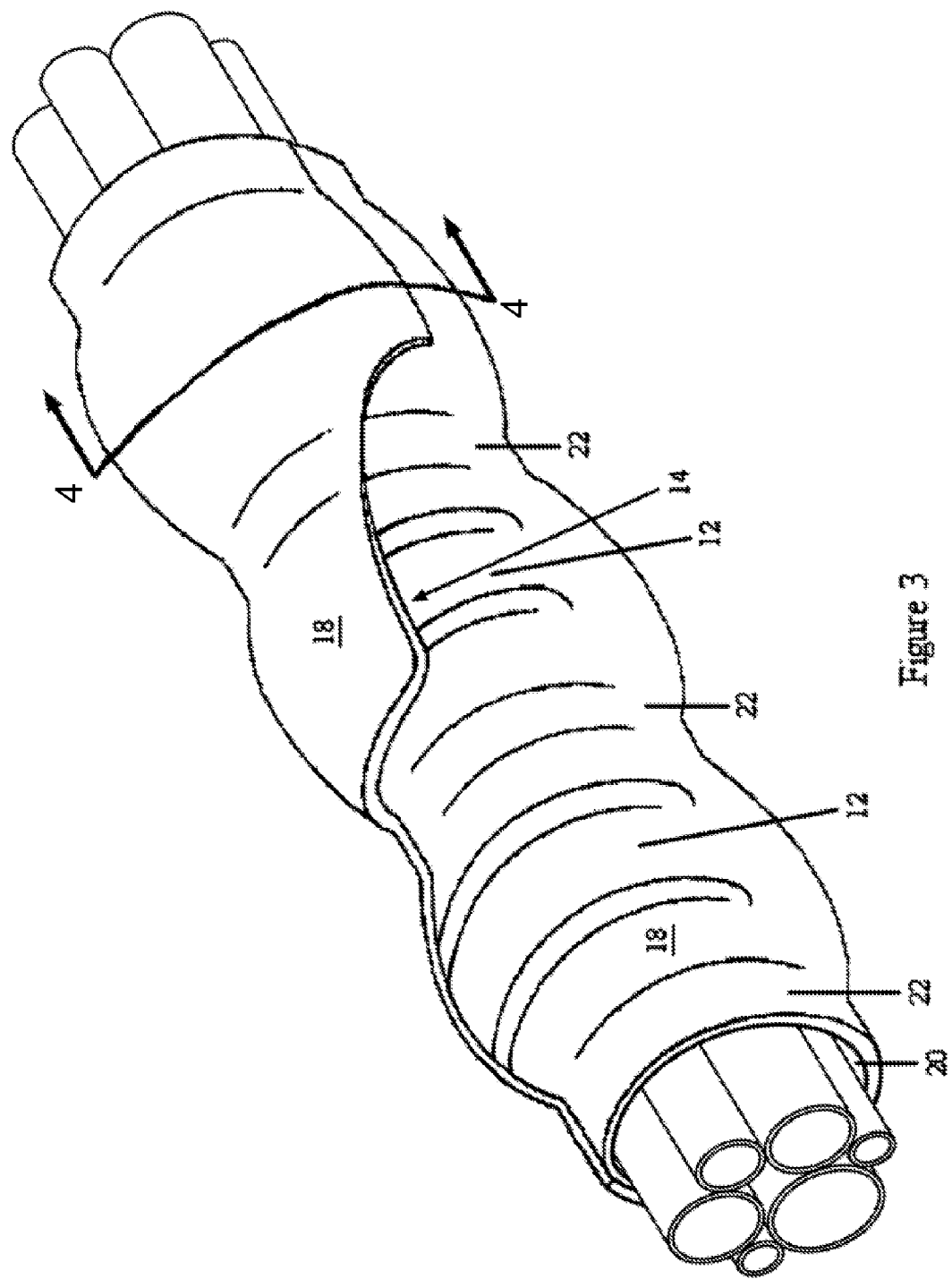
FIG. 3 shows a cut-away view of the hose shroud in accordance with the present invention engaging a bundle of hoses.

Shown in FIG. 1 the hose shroud 10 not engaging a bundle of hoses, the hose shroud 10 is arranged such that an opening between the inner edge 24 and the outer edge 26 allows the hose shroud to be slipped over a. bundle of hoses or lines. Once engaged with the bundle of hoses or lines (as shown in FIG. 3) the inner edge 24 is arranged to pass over the outer edge 26 thereby covering the bundle of hoses or lines.

The hose shroud 10 is arranged to engage a bundle of hoses such that when engaged the hose shroud 10 completely covers the entire bundle of hoses and an amount of the hose shroud 10 overlaps itself. In situations where a large bundle of hoses needs to be engaged multiple sections of the hose shroud 10 may be employed to ensure that an overlap occurs (see FIG. 5).

Figure 4:
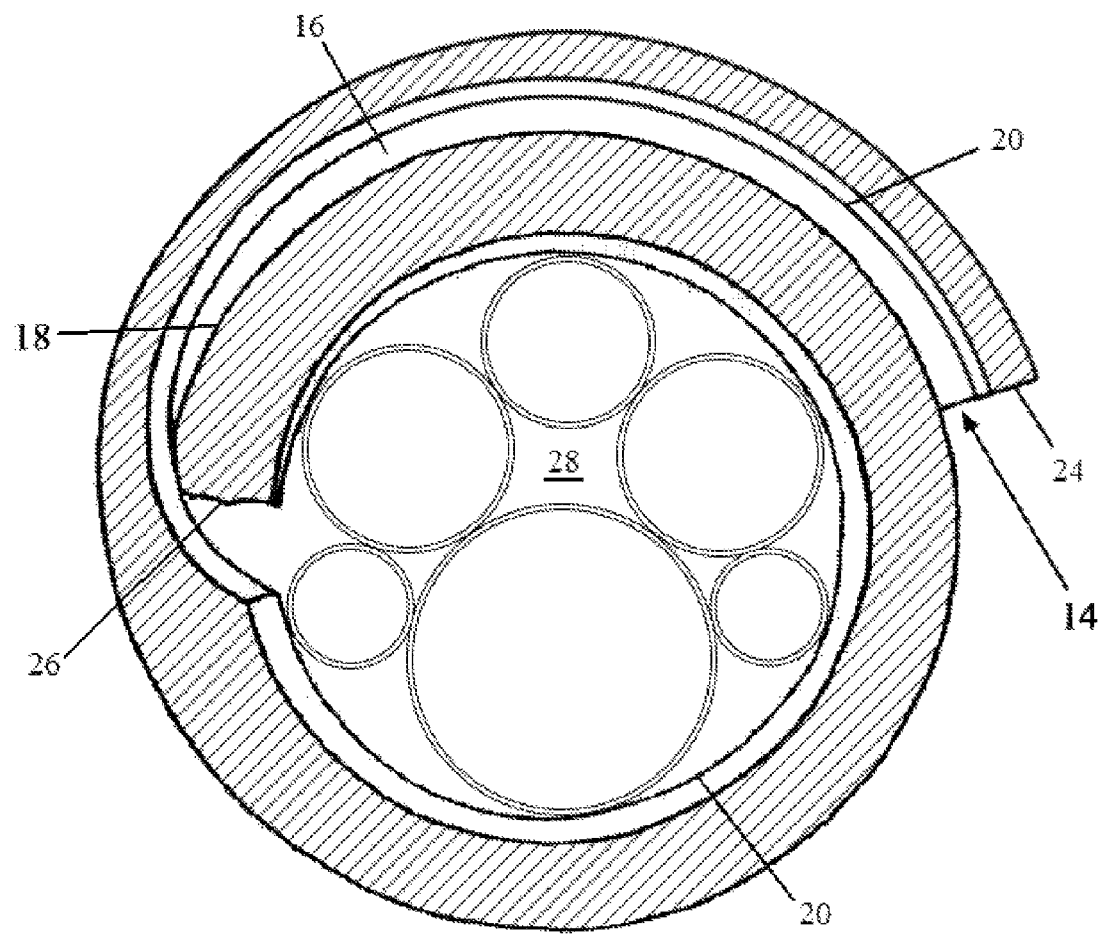
FIG. 4 shows a cross-sectional view of an hose shroud along the line 4-4 of FIG. 3 in accordance with the present invention.

Once engaged with a bundle of hoses an inner wall surface 20 and an outer wall surface 18 of the expanded section 12 engage, whereby an outer edge 26 of the hose shroud 10 passes under an inner edge 24 forming a reservoir 28 (see FIG. 4). The arrangement of the inner wall surface 20 and the outer wall surface 18 define the lumen 14 (see FIG. 3). The reservoir 28 is defined by the clamping sections 22 that are held in close contact with the bundle of hoses or lines and the inner wall 20.

Figure 2:
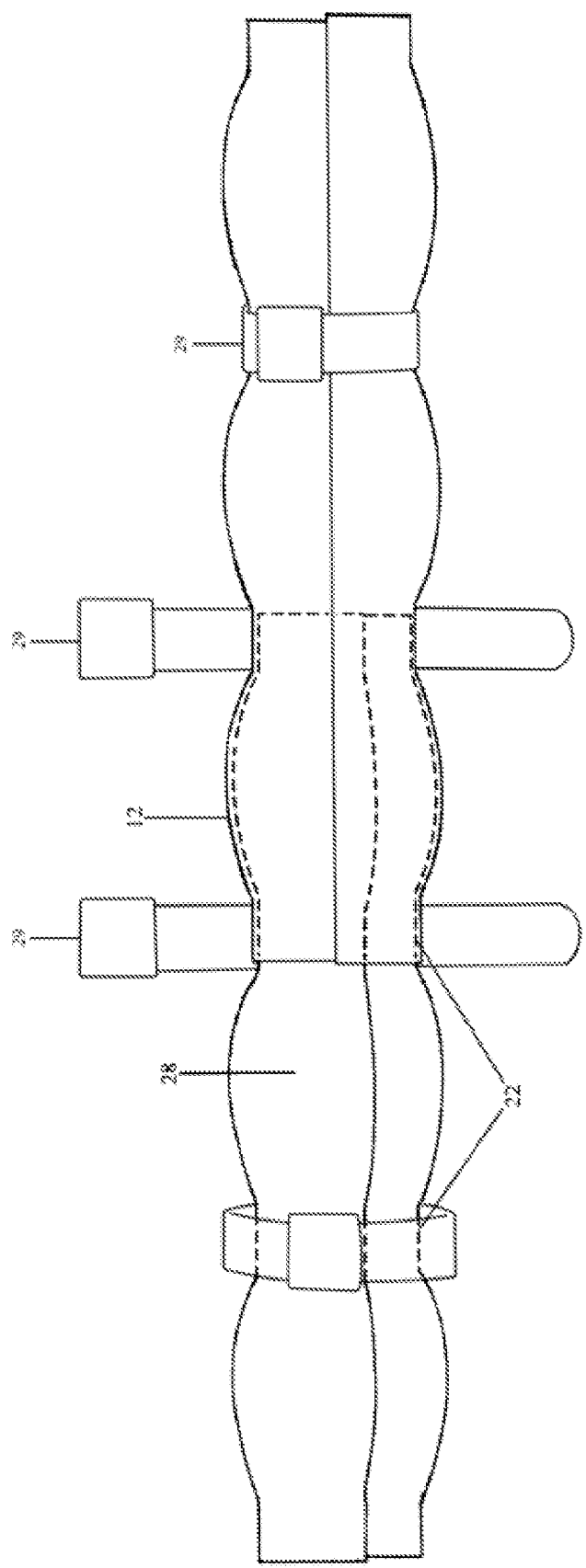
FIG. 2 shows two hose shrouds in accordance with the present invention arranged to join together.

The lumen 14 is arranged to maintain fluid communication between the reservoir 28 and the exterior of the elongated hose shroud 10. As shown in FIG. 2, the hose shroud 10 typically comprises a plurality of reservoirs 28 alternating with a plurality of clamping sections 22.

Referring to FIG. 3, shown is a cut away view of the hose shroud in accordance with the present invention. The spaced apart inner wall surface 20 and outer wall 18 surface define the lumen 14. The lumen 14 extends throughout the overlapping portions of the expanded section 12. The web section 30 is arranged to be in close contact with the outer wall surface 18. The web portion 30 acts to prevent swarf or foreign material from entering the lumen 14 from the exterior of the shroud.

Referring to FIG. 4, shown is a cross-sectional view (taken along the line 4-4 shown in FIG. 3) of the hose shroud 10 engaging a bundle of hoses or lines. The inner wall surface 20 and outer wall surface 18 are shown spaced apart defining the lumen 14. The lumen 14 extends throughout the overlapping portions of the expanded section 12 placing the reservoir 28 in fluid communication with the exterior of the hose shroud 10.

Figure 5:
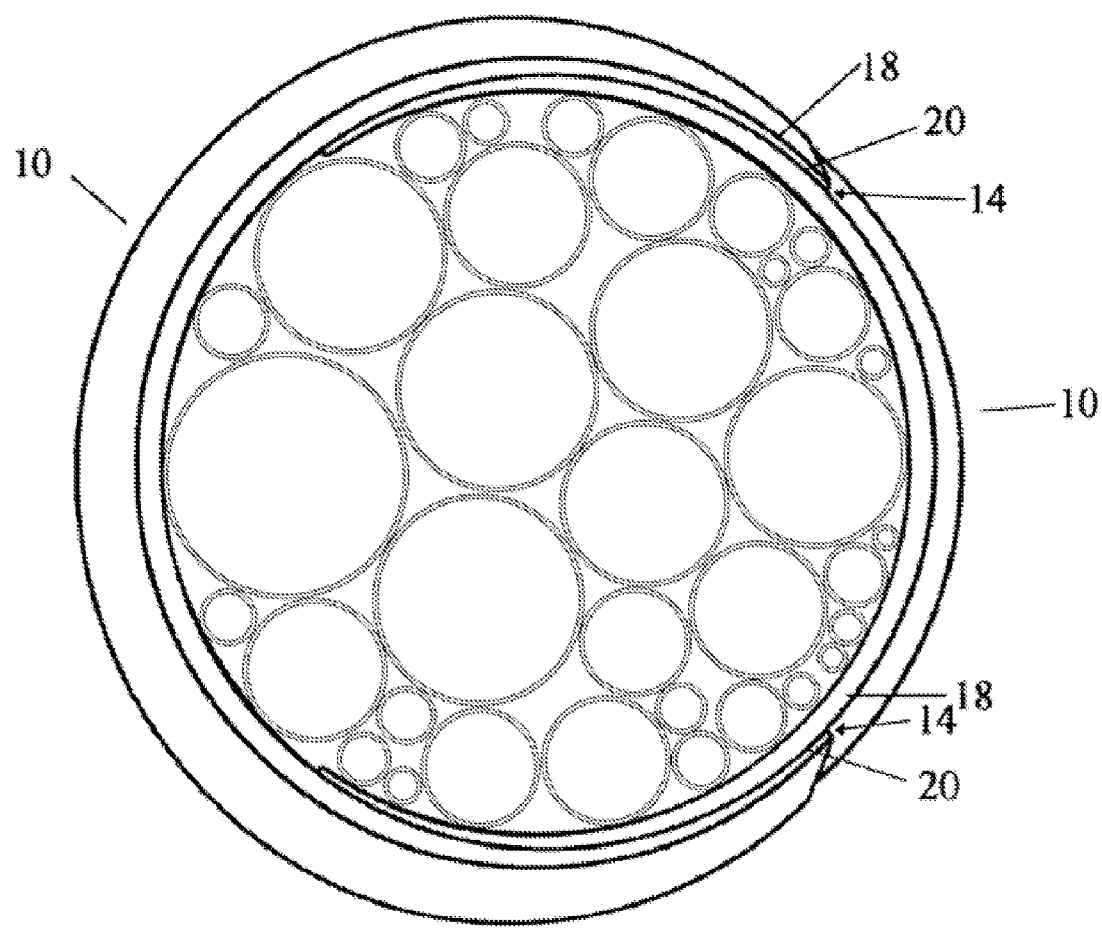
FIG. 5 shows two hose shrouds of the present invention being arranged to engage a large bundle of hose or lines.

FIG. 5 shows two hose shrouds 10 arranged to engage a larger diameter bundle of hoses or lines. In situations where larger bundle of hoses or lines must be engaged, two or more hose shrouds 10 may be overlapped to ensure that the bundle is covered.

In the event of the reservoir 28 filling with fluid, the lumen 14 will act as an escape path for the fluid, whereby the fluid contained within the reservoir 28 is released without being able to reach high pressure. The raised protuberances 16 on the outer wall 18 engage the inner wall surface 20 of the inner edge 24 maintaining the lumen 14.

In use, the hose shroud 10 is arranged to be fitted over and wrapped around a bundle of hydraulic hoses (as shown in FIGS. 3 and 4). The hose shroud 10 is arranged to have the outer edge 26 pass under the inner edge 24. The hose shroud 10 is then securely clamped in place by clamps 29 engaging with respective clamping sections 22. Once fitted the hose shroud 10 acts as a physical barrier to prevent swarf or foreign material from passing into the bundle of hydraulic hoses.

The expanded sections 12 define reservoirs 28 once the hose shroud 10 is engaged with a bundle of hoses. The reservoirs 28 are arranged in such a manner that in the event of a hose contained within the hose shroud 10 bursting or beginning to leak, fluid will initially be trapped within the reservoir 28. Once the reservoir 28 is filled, the fluid contained there within will be able to exit through the lumen 14 to the exterior of the hose shroud 10 in a controlled manner.

Although the inner wall surface 20 and the outer wall surface 18 are in close contact the lumen 14 will be maintained due to inter-engagement of the protuberances 16 and the inner wall surface 20. The protuberances 16 engage the inner wall surface 20 of the inner edge 24 in such a manner that regardless of the pressure applied in engaging the hose shroud 10 around the bundle of hydraulic hoses, the lumen 14 though possibly partially reduced in cross section will be maintained.

In the event of the reservoir 28 filling with liquid under pressure, liquid will be forced along the lumen 14 to the exterior of the hose shroud 10 and discharged. Due to the increased area of release, the resulting spill of fluid will be at a greatly reduced pressure in comparison to that of the puncture point, thus reducing the danger of injury to personnel as a result of a leak.

Further, the action of the reservoir may enable personnel to notice a problem prior to the expulsion of liquid through the lumen 14. Once the operating pressure of the hydraulic fluid drops as fluid is lost through the damaged hose or line, the operator of whatever machinery that is currently being powered may have a greater time to respond, prior to hydraulic fluid escaping into the work area. Thus, there is provided an opportunity to power the machinery down before leakage out of the hose shroud 10 occurs.

Although the hose shroud 10 may be of any length it may still in certain circumstances be necessary to join additional sections of the hose shroud 10 together to engage a bundle of hoses or lines as shown in FIG. 2. Individual sections of the hose shroud 10 may be interconnected by arranging a first clamping section 22 of a first piece of hose shroud 10 to come into close contact with a second clamping section 22 of a second piece of hose shroud 10, such that when clamps or mounting brackets are placed over the clamping section 22, the clamping sections 22 of both pieces are brought into close contact with each other.

It may be necessary to use known abrasive resistance components in areas where the bundle it likely to rub against a foreign body.

Modifications and variations as would be apparent to a skilled addressee are deemed to be within the scope of the present invention.

The invention claimed is:

1. A hose shroud arranged to cover and engage a bundle of hoses or lines, wherein said hose shroud comprises an inner wall surface, an outer wall surface, an inner edge, and an outer edge, said inner wall surface defines a reservoir with a fluid capacity, said reservoir may accumulate fluid that escapes from said hoses or lines, said outer wall surface has a plurality of raised protuberances, said plurality of raised protuberances engage said inner wall surface forming a lumen between two of said protuberances of said plurality of raised protuberances, said lumen extends in a circumferential direction about said hose shroud, said lumen allows said fluid to escape from said reservoir and to exit said hose shroud when the amount of fluid exceeds said fluid capacity of said reservoir.

2. A hose shroud in accordance with claim 1, wherein said hose shroud comprises a plurality of alternating expanded sections and clamping sections.

3. A hose shroud in accordance with claim 2, wherein said clamping sections are held in close contact with said bundle of hoses or lines.

4. A hose shroud according to claim 1, wherein said outer edge further comprises a web portion to prevent swarf or foreign matter from entering said lumen.

5. A hose shroud according to claim 2, further comprising clamps arranged to hold each clamping section of said plurality of alternating expanded sections and clamping sections of said hose shroud in close contact with said bundle of hoses or lines.

6. A hose shroud according to claim 1, wherein said hose shroud comprises an elastomeric polymer material.

7. A hose shroud according to claim 1, wherein said hose shroud comprises a thermoplastic material.

8. A hose shroud according to claim 1, wherein said hose shroud comprises a polyurethane material.

9. A hose shroud assembly, comprising:
a first hose shroud and a second hose shroud arranged to cover and engage a bundle of hoses or lines, wherein each of said first and second hose shrouds further comprises an inner wall surface and an outer wall surface, said inner wall surface defines a reservoir with a fluid capacity, said reservoir may accumulate fluid that escapes from said hoses or lines, said outer wall surface has a plurality of raised protuberances, said plurality of raised protuberances engage said inner wall surface forming a lumen between two of said protuberances of said plurality of raised protuberances, said lumen allows said fluid to escape from said reservoir and to exit said hose shroud when the amount of said fluid exceeds said fluid capacity of said reservoir, said lumen extends in a circumferential direction about said hose shroud, and a plurality of alternating expanded sections and clamping sections, said first hose shroud being axially spaced from said second hose shroud such that at least one clamping section of said plurality of alternating expanded sections and clamping sections of said first hose shroud aligns with and overlaps a corresponding number of clamping sections of said plurality of alternating expanded sections and clamping sections of said second hose shroud; and,
clamps holding said overlapping number of clamping sections in close contact with each other, said clamps further holding said clamping sections of said first and second hose shrouds tightly around said bundle of hoses or lines.

* * * * *

UNITED STATES PATENT AND TRADEMARK OFFICE
CERTIFICATE OF CORRECTION

| | |
|---|---|
| PATENT NO. | : 9,052,042 B2 |
| APPLICATION NO. | : 13/639894 |
| DATED | : June 9, 2015 |
| INVENTOR(S) | : May |

Page 1 of 1

It is certified that error appears in the above-identified patent and that said Letters Patent is hereby corrected as shown below:

In the Specification

Col. 1, line 37, after "arranged to" delete "foml" and insert --form-- therefor.

Col. 2, line 18, after "slipped over" delete "a." and insert --a-- therefor.

Signed and Sealed this
Second Day of February, 2016

Michelle K. Lee
*Director of the United States Patent and Trademark Office*